United States Patent
Edelstein

(10) Patent No.: US 9,467,660 B1
(45) Date of Patent: Oct. 11, 2016

(54) MAP GENERATION USING MAP FEATURES FROM USER CAPTURED IMAGES

(71) Applicant: Amazon Technologies, Inc., Reno, NV (US)

(72) Inventor: David Adam Edelstein, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 263 days.

(21) Appl. No.: 14/231,548

(22) Filed: Mar. 31, 2014

(51) Int. Cl.
*H04N 7/18* (2006.01)

(52) U.S. Cl.
CPC ............................ *H04N 7/18* (2013.01)

(58) Field of Classification Search
None
See application file for complete search history.

(56) References Cited

U.S. PATENT DOCUMENTS

| 8,422,994 | B2* | 4/2013 | Rhoads | G01C 21/20 455/411 |
| 2010/0066814 | A1* | 3/2010 | Su | G01C 21/36 348/47 |
| 2012/0070090 | A1* | 3/2012 | Chang | G06K 9/00 382/218 |
| 2013/0084013 | A1* | 4/2013 | Tang | G06K 9/4671 382/195 |
| 2013/0243250 | A1* | 9/2013 | France | G01C 15/00 382/103 |

* cited by examiner

*Primary Examiner* — Reza Aghevli
(74) *Attorney, Agent, or Firm* — Seyfarth Shaw LLP; Ilan N. Barzilay

(57) ABSTRACT

Various embodiments enable a user to capture an image of a map, such as a map of a municipal or amusement park, mall, golf course, or the like, using a camera of a computing device to geocode features of the map that may not be available for display through a native mapping application. For example, a park map may show walking trails, vista points, restrooms, playgrounds, or other locations of interest, which may not be represented by the mapping application. Accordingly, once these previously unrepresented features are associated with a particular location, they can be represented within a map of a native mapping application of the user's computing device, thereby, enabling the user to see their location within the map relative to these features and navigate through the park using the same.

20 Claims, 11 Drawing Sheets

MAP GENERATION USING MAP FEATURES FROM USER CAPTURED IMAGES

BACKGROUND

People are increasingly relying on portable computing devices, such as tablets and smart phones, which are able to use components such as a global positioning system (GPS) to determine a present location of a device. Such devices, using a mapping application, can enable a user to display a map of surrounding areas, as well as to find directions to specific locations or points of interest and navigate to those locations. Since these mapping applications provide this information over such a vastly large area, however, it is often a challenge to keep this information current, particularly in remote or less densely populated areas. For example, a user travelling through such an area may discover that a business shown on the map has been closed for months because the location data for this area may only be verified or update once or twice a year. Further, many locations contain local or insider knowledge for points of interest that someone visiting may not have been able to hear of or learn about prior to actually visiting the area and speaking with local residents. In such an instance, a visitor would likely be unable to find this information through a mapping application since the entity providing the data for the same is located potentially thousands of miles away and, therefore, far removed from any local or insider knowledge. Accordingly, since local knowledge often trumps data from an established provider, it can be advantageous to provide users with an ability to access local information through an existing mapping application on their portable computing device.

BRIEF DESCRIPTION OF THE DRAWINGS

Various embodiments in accordance with the present disclosure will be described with reference to the drawings, in which.

DETAILED DESCRIPTION

Figure 1:
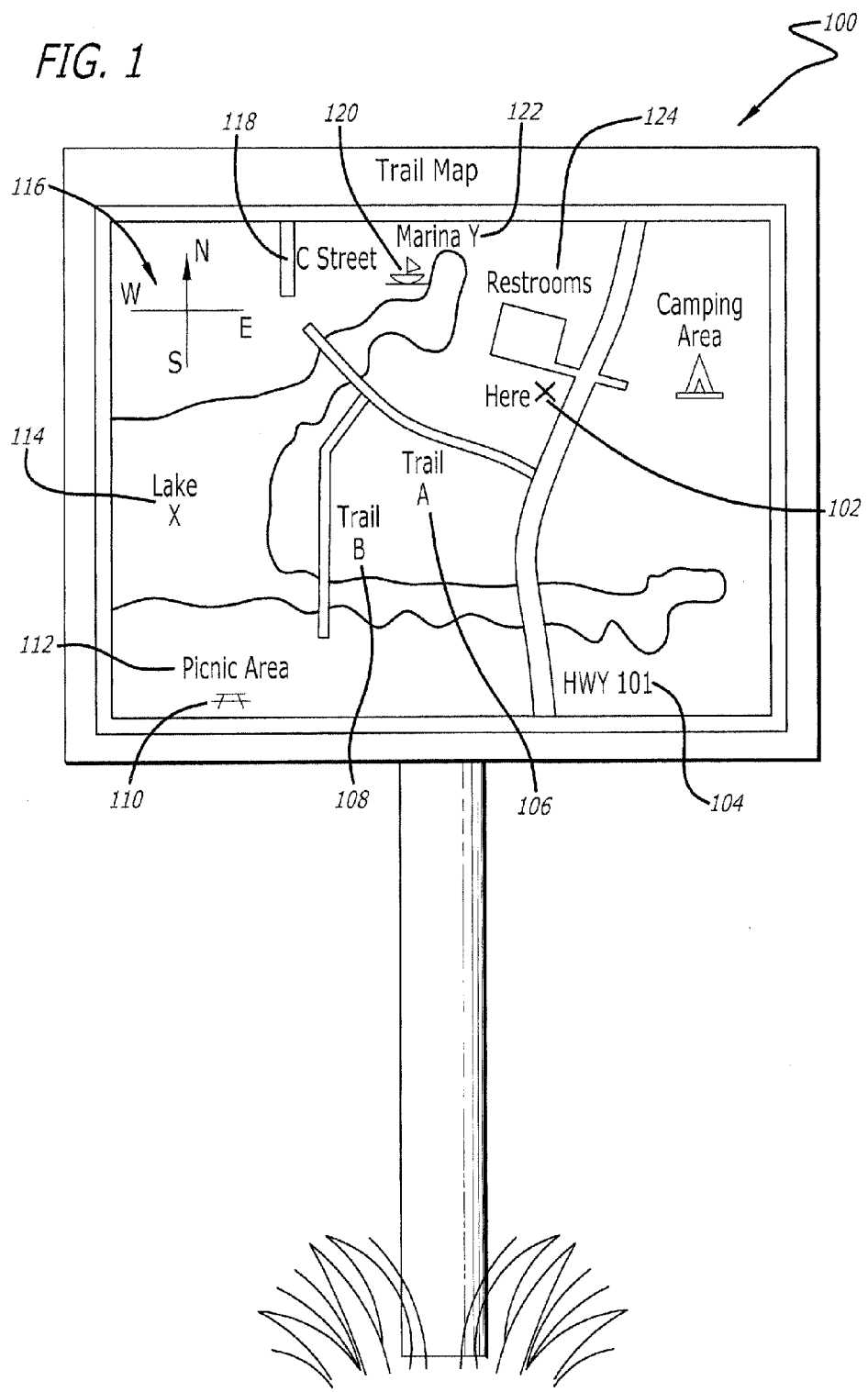
FIG. 1 illustrates an example trail map that can be used to illustrate various features in accordance with various embodiments.

Systems and methods in accordance with various embodiments of the present disclosure may overcome one or more of the aforementioned and other deficiencies experienced in conventional approaches to providing mapping information on a computing device. In particular, various approaches enable a user to capture an image of a map (e.g., a map for a local, national, or amusement park, mall, golf course, etc.) using a camera of a computing device to geocode features of the map that may not be available for display through a native mapping application. For example, a park map may show walking trails, vista points, restrooms, playgrounds, or other locations of interest and amenities, which may not be represented by the mapping application that is primarily concerned with street maps and the location of businesses. Accordingly, once these previously unrepresented or uncommon features are geocoded (i.e., associated with a particular location, assigned latitude/longitude coordinates, etc.), they can be represented within a map of a native mapping application of the user's computing device, thereby, enabling the user to see their location within the map relative to these features and navigate through the park using the same. Alternatively, once the features (i.e., previously unrepresented and previously represented) of the map captured in the image are geocoded, the user can view their current location and monitor their movement within the park using the captured image of the map.

In at least one embodiment, in order to provide such local information through an existing mapping application, a computing device can, upon obtaining an image of a map, analyze the image to identify geographic, or other identifying, features (e.g., roads, lakes, rivers, landmarks, etc.). These features are then compared, using geographic feature matching, to a version of the map stored as map data that is used by the mapping application to render maps on the user's computing device. Various techniques can be used to filter the amount of map data to compare against these features. For example, using Global Positioning System (GPS) data, the location and orientation of the computing device can be determined to limit the map data for which to compare against these features to within a certain distance of the computing device. Additionally, map labels that identify landmarks associated with a particular location, such as roads, rivers, lakes, and the like, can be recognized from the image using text recognition and compared to the map data.

Accordingly, the shapes of the features in the image can be compared against the shapes of the features of a map represented by the map data for the location and orientation of the computing device. Features of the map image that have a corresponding matching feature in the map data can be used as anchors for correctly placing, orientating, and scaling the map image to display with the mapping application In one example, an image registration algorithm can be used to relate corresponding features. Since it is common for trail maps and, more particularly, for amusement park maps to be represented in a scale that is not one-to-one with real-world features (as maps from a mapping application can be), the alignment points can also be used for adjusting a scaling factor (e.g., stretching, shrinking, enlarging, etc.) of features from the map image that do not have a corresponding matching feature in the map data (i.e., additional or new features) to compensate for spatial inconsistencies between maps. Further, many amusement park maps are represented from a perspective view, which can also vary the relative distances between features of the map image and their corresponding features in the map data. Once the new features from the map image are adjusted to fit the scale of the map data, the new features can be geocoded or associated with a location (i.e., latitude/longitude coordinates). Accordingly, the new geocoded features from the trail map can then be displayed concurrently with a map for the current location of the computing device to, therefore, enable users to view their current location on a map relative to these new features and navigate using the same.

Various other functions and advantages are described and suggested below as may be provided in accordance with the various embodiments.

FIG. 1 illustrates an example trail map 100 that could be located along a trail in a national park. Although, a map for a national park is shown, it should be understood that a map for an amusement park, a mall, or any location can also be used as well within the scope of various embodiments. In this example, trail map 100 includes current location indicator 102 enabling a user to orientate themselves within the park relative to trail map 100 and text labels identifying locations of interest or amenities, such as 'highway 101' 104, walking 'Trail A' 106, walking 'Trail B' 108, 'Picnic Area' 112, 'Lake X' 114, 'C Street' 118, 'Marina Y' 122, 'Restrooms' 124, and 'Camping Area' 126. Trail map 100 also includes area icons for some of these locations of interest, such as tent icon for 'Camping Area' 126, table icon 110 for 'Picnic Area' 112, and boat icon 120 for 'Marina Y' 122. Each of these locations of interest or amenities is potentially of use to visitors of this park. However, since many of these locations of interest or amenities are located away from established roads, it is common for these map features to be missing from a map provided though a native mapping application that is primarily concerned with street maps and business locations.

Figure 2:
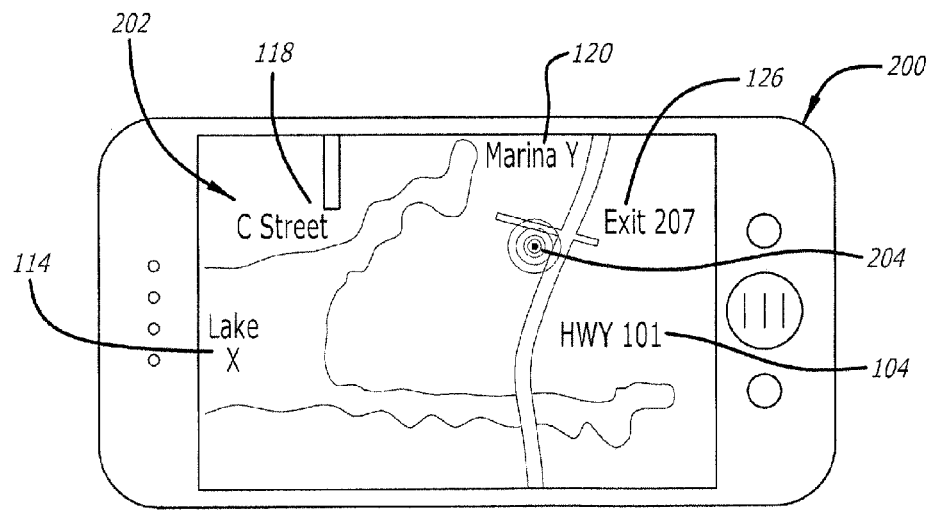
FIG. 2 illustrates an example of a conventional map displayed on a computing device for the location associated with the trail map of FIG. 1.

Accordingly, FIG. 2 illustrates region 202 which is a portion of a world map that corresponding to an example current location of computing device 200, which is also substantially the same region represented in trail map 100. As is known for conventional mapping applications, a location of interest (e.g., a current location, destination, business, landmark, etc.) can be provided by a user, determined by a global positioning system (GPS) or other location determining mechanism, or otherwise obtained. Based on this information, a set of pre-rendered, geo-referenced map tiles can be obtained that correspond to locations within a given distance of the location of interest. Accordingly, in this example, map tiles have been obtained and displayed based on the current location of computing device 200, as represented on region 202 as current location pin 204. A protocol such as the web map tile service (WMTS) can be used to serve these map tiles over a network such as the Internet. These tiles often take the form of two-dimensional images that, when displayed proximate each other on a display screen, form a two-dimensional map, such as shown for region 202 displayed on computing device 200.

In this example, a user standing in front of trail map 100 (e.g., current location pin 204 corresponds to current location indicator 102 of trail map 100) has opened the native mapping application on computing device 200 in order to receive map information for the region represented on trail map 100. As one would expect, the pre-rendered, geo-referenced map tiles for a conventional map for region 202 contains information that is represented on trail map 100. For example, the conventional map for region 202 includes labels for 'highway 101' 104, 'Lake X' 114, 'C Street' 118, and 'Marina Y' 122. Since, as mentioned above, many of these mapping applications are primarily concerned with street maps and business locations, it is common for roads (e.g., 'highway 101' 104 and 'C Street' 118) and major landmarks (e.g., 'Lake X' 114) and points of commercial interest (e.g., 'Marina Y' 122) adjacent these roads to be represented or identified by a mapping application for a particular region. The pre-rendered, geo-referenced map tiles for the conventional map of region 202 do, however, omit many features or locations of interest that are represented on trail map 100 (e.g., 'Trail A' 106, 'Trail B' 108, 'Picnic Area' 112, 'Restrooms' 124, and 'Camping Area' 126). There are potentially many factors driving such omissions. For example, these features may only be known to local residence, such as if trail map 100 were erected by a small township in a scarcely population region. In such an instance, someone visiting this area may have to actually speak with local residents or stumble upon trail map 100 to learn of its existence. Accordingly, if the features of trail map 100 are only known to local residents, or some other small population, a map data provider, who could primarily be located potentially thousands of miles away (i.e., far removed from local or insider knowledge), is unlikely to have knowledge of and incorporate these features into a data set for these mapping applications. Accordingly, since local knowledge often trumps data from an established map data provider, a method to provide users with the ability to access and/or incorporate such local information through the existing mapping application on their portable computing device is desirable.

Accordingly, various embodiments discussed herein enable a user to capture an image of a map, (e.g., a map for a local, national, or amusement park, mall, golf course, etc.) using a camera of a computing device to geocoded features of the map that are not represented by a map provided by a native mapping application. Once these previously unrepresented or uncommon features are geocoded (i.e., associated with a particular location, assigned latitude/longitude coordinates, etc.), they can be represented within a map of the native mapping application of the user's computing device for the user to be able to see their current location on the map relative to these features and enable the user navigate through the region using the same.

Figure 3:
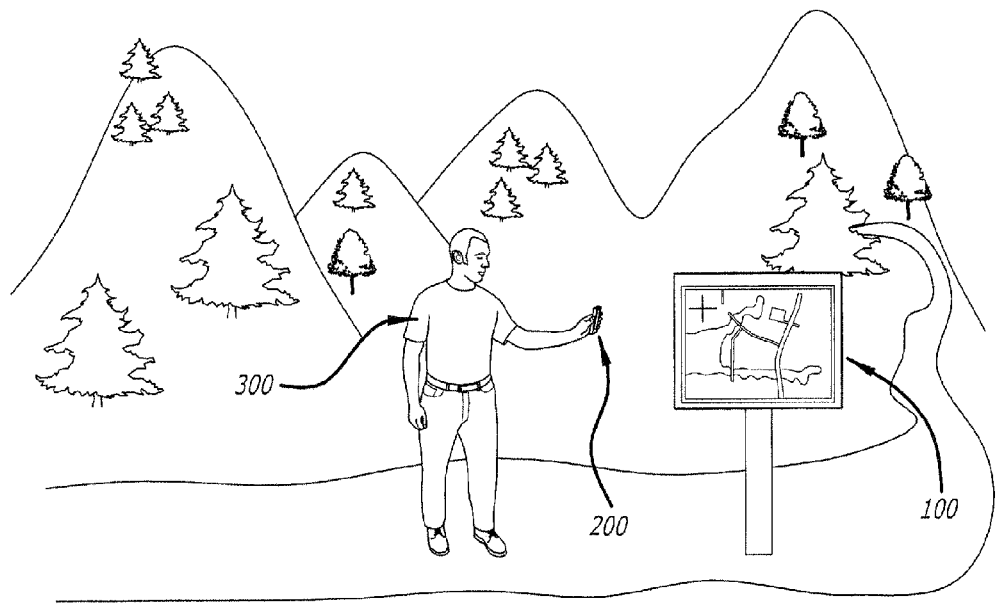
FIG. 3 illustrates an example of a user capturing an image of a trail map using a computing device in accordance with at least one embodiment.
Figure 4:
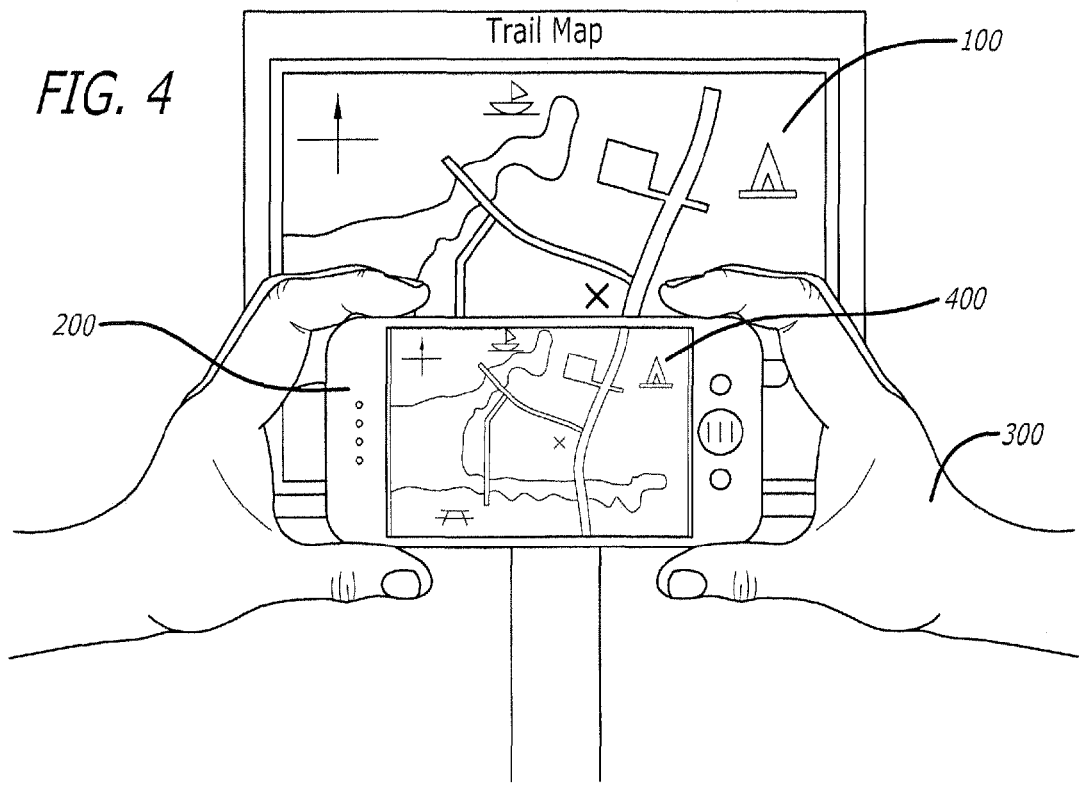
FIG. 4 illustrates an example perspective view of the image of the trail map from FIG. 3 being captured in accordance with at least one embodiment.

Accordingly, FIG. 3 illustrates an example situation showing user 300 walking along a trail and capturing an image of trail map 100 using computing device 200 in accordance with at least one embodiment. In this example, user 300 could be camping in 'Camping Area' 126 but would like to go on a hike to 'Picnic Area' 112. It would, therefore, be advantageous if user 300 had access to the information represented on trail map 100 through the native mapping application on computing device 200 in order to enable user 300 to track his progress, take alternative trails, see certain landmarks, know where the restrooms, rangers, or other amenities are located, and even go off trail altogether and be confident in making it to 'Picnic Area' 112 and back later to 'Camping Area' 126. As discussed with respect to FIG. 2, however, user 300 is unable to obtain this information through the native mapping application. Accordingly, taking advantage of the teaching discussed herein, user 300 captures trail map image 400, as shown in FIG. 4, using computing device 200 in order to view their location on a map incorporating these locations of interest or features.

In at least one embodiment, once captured, trail map image 400 can be subsequently analyzed to identify geographic, or other identifying, features represented in trail map 100. In order to identify these features, a computer vision algorithm such as Scale-Invariant Feature Transform (SIFT), Speeded Up Robust Features (SURF), or any other feature detection algorithm can be used to detect local features of trail map image 400. Once these map image features are identified, the shapes of these map image features can be compared against the shapes of features of a version of the map stored as map data (e.g., data for the pre-rendered, geo-referenced map tiles, etc.) using a shape matching algorithm, such as Accumulated Signed Gradient (ASG). In this example, each of the features discussed above with respect to FIG. 1 (e.g., 'highway 101' 104, walking 'Trail A' 106, walking 'Trail B' 108, 'Picnic Area' 112, 'Lake X' 114, 'C Street' 118, 'Marina Y' 122, 'Restrooms' 124, 'Camping Area' 126, etc.) could identified by a feature detection algorithm for comparison against the version of the map stored as map data which is used by computing device 200 to generate, in this example, conventional map 202. In another example, trail map image 400 can be analyzed using a text recognition algorithm to identify labeled features, such as roads, rivers, lakes, parks, and the like. Further, since bodies of water (e.g., lakes, rivers, oceans, etc.) are often represented by the color blue, roads are often represented in black, parks or forest are often represented by the color green, and the like, the color of features from trail map image 400 can be analyzed using a pattern recognition algorithm to match features in the database for the native map application. These features, which can be used to filter the map data and/or verify the results from the shape matching algorithm, will be discussed further with respect to FIGS. 6-10.

Given the abundance of map data, it can be necessary to filter or narrow the set of map data (e.g., for minimizing latency, the consumption of processing resources, etc.) to compare against these map image features. For example, when user 300 captures trail map image 400, computing device 200 can determine the user's (i.e., computing device 200) current location (e.g., using Global Positioning System (GPS) data, etc.). Accordingly, the set of map data can initially be restricted to the general region surrounding the user's current location. This map data can then be compared to the geographic, or other identifying, features represented in trail map 100, as mentioned above, using a shape or feature matching algorithm to register trail map image 400 relative to the conventional map for region 202. Accordingly, the shapes of the features in trail map 100 can be compared against the shapes of the features of the version of the map stored as map data for the location of the computing device. In this example, the shape matching algorithm has identified 'highway 101' 104, 'Lake X' 114, 'C Street' 118, and 'Marina Y' 122 as features that are common to both trail map image 400 and the map data. Accordingly, these matching features can be used as alignment anchors in order to correctly place, orient, and scale trail map image 400 for display. The alignment anchors, as will be discussed further with respect to FIGS. 6-8, can also be used to adjust a scaling factor (e.g., stretching, shrinking, enlarging, etc.) of features from trail map image 400 that do not have a corresponding matching feature in the map data (e.g., 'Trail A' 106, 'Trail B' 108, 'Picnic Area' 112, 'Restrooms' 124, and 'Camping Area' 126), since it is common for trail maps and, more particularly, for amusement park maps to be represented in a scale that is not one-to-one with real-world features, for example, as is often the case with maps generated using a mapping application. Once the new features from trail map image 400 are adjusted to fit the scale of the map data to compensate for spatial inconsistencies, the new features can be geocoded or associated with a location (i.e., latitude/longitude coordinates).

Figure 5:
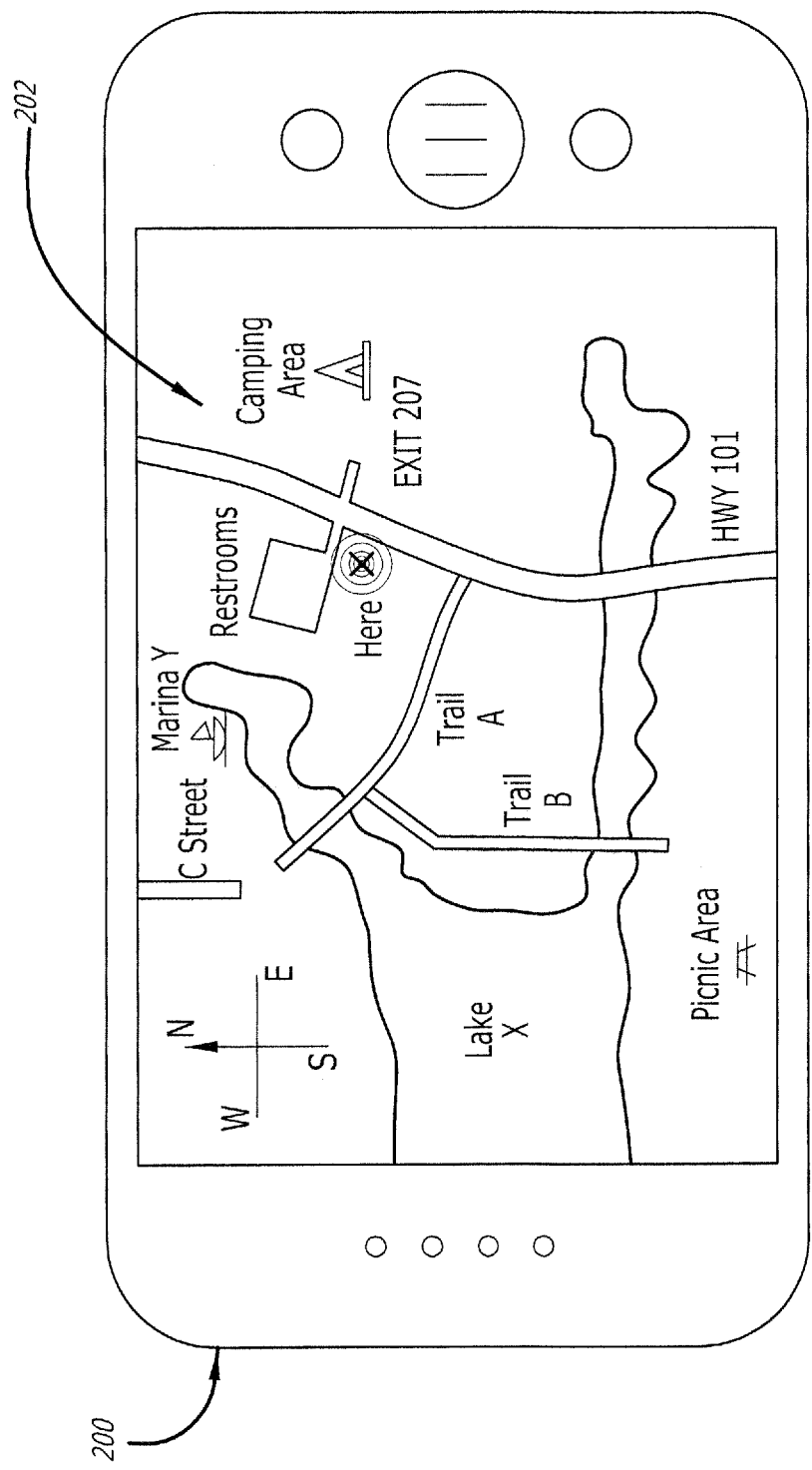
FIG. 5 illustrates an example screenshot of a trail map display on a display screen of a computing device in accordance with at least one embodiment.

In at least one embodiment, the new geocoded features (e.g., 'Trail A' 106, 'Trail B' 108, 'Picnic Area' 112, 'Restrooms' 124, and 'Camping Area' 126) can be displayed concurrently with a map for the current location of the computing device to, therefore, enable users to view their current location on the map relative to these new features and to navigate around the park using the same. FIG. 5 illustrates an example screenshot of a map, in accordance with at least one embodiment, that includes features from both trail map image 400 and a screenshot of the conventional map for region 202 displayed concurrently on computing device 200. In one example, the new geocoded features (e.g., 'Trail A' 106, 'Trail B' 108, 'Picnic Area' 112, 'Restrooms' 124, and 'Camping Area' 126) could be displayed as an overlay over the conventional map for region 202 displayed using the native application of computing device 200. Therefore, in at least one embodiment, the uncommon features identified from trail map image 400 are graphically manipulated or adjusted to compensate for spatial inconsistencies between respective maps and the uncommon features are displayed as an overlay with a scaled map. Alternatively, using the alignment anchors and geocoded features, features of the trail map image 400 are associated with latitude/longitude coordinates based on their relative location in the conventional map, and the trail map image 400 is displayed to the user on computing device 200 as if the user were observing their current location 102 move on trail map 100 as they move within the park. Therefore, in at least one second embodiment, the appearance of trail map image 400 remains constant (e.g., no graphical adjustment) while the relative distance between respective latitude/longitude coordinates of the conventional map is adjusted (e.g., stretched or compressed relative to each other) to reflect the visual scale of features of the trail map 100.

Figure 6A:
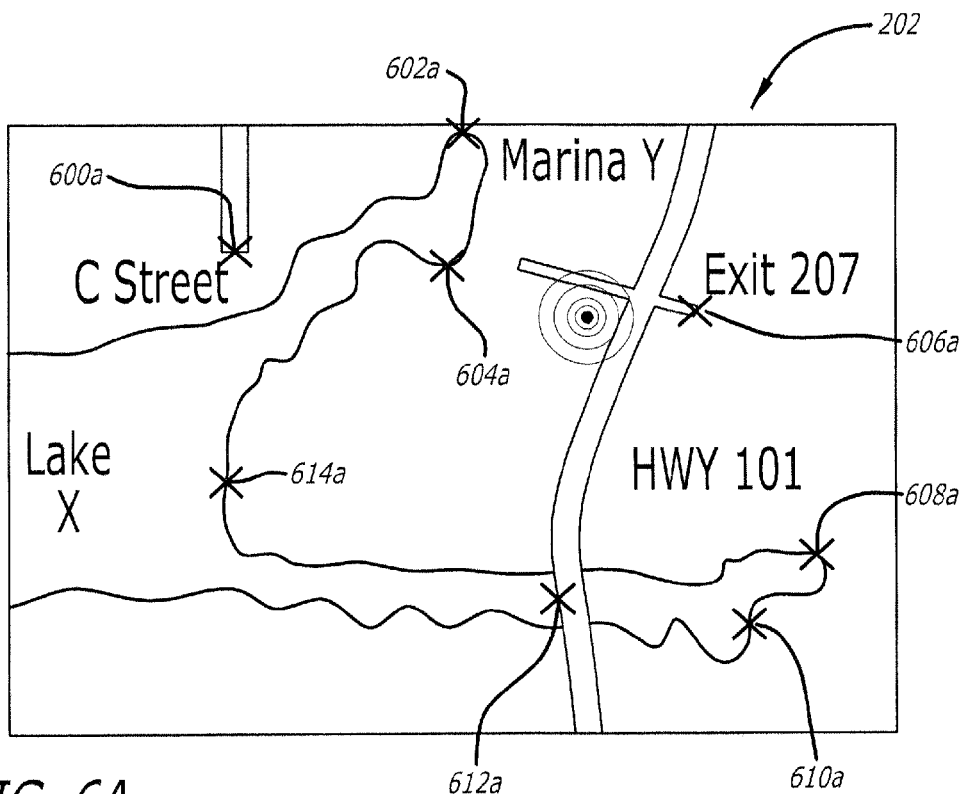
FIGS. 6A to 6B illustrate example alignment anchors that can be used to align features of an image of a trail map with a map from a native map application in accordance with at least one embodiment.
Figure 6B:
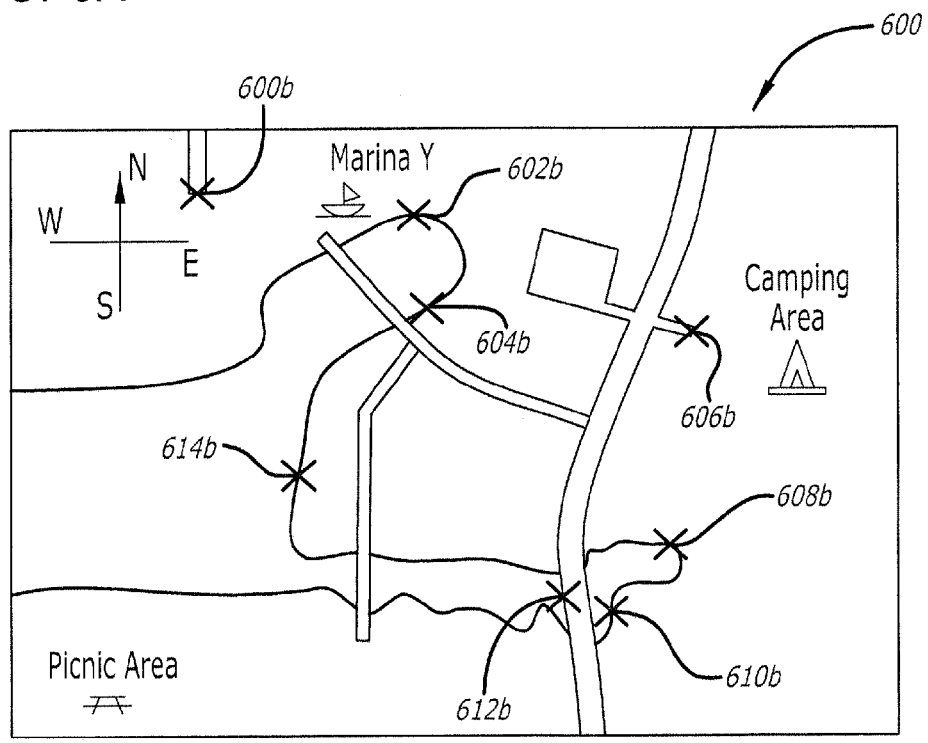

FIGS. 6A to 6B illustrates example alignment anchors, determined by a feature matching algorithm, that can be used to align features of trail map image 400 with those of the conventional map for region 202 from a native map application in accordance with at least one embodiment. As used herein, the alignment anchors can be points (e.g., control points) corresponding to corners, inflection points, and the like of physical features or the alignment points could be whole physical features, such as lakes, coastlines, highways, and the like. In this example, feature matching between maps having different scales, relative feature sizes, proportions, or the like is illustrated. As mentioned above, once the features of trail map image 400 are identified, their shapes can be compared against the shapes of features of the conventional map for region 202 using a shape or feature matching algorithm, such as RANdom SAmple Consensus (RANSAC). For example, when a number of anchors exceed the required minimum to define an appropriate transformation, RANSAC (or other iterative algorithm) can be used to estimate the transformation for registering trail map image 400 relative to the conventional map for region 202. Accordingly, the shape of each feature of trail map image 400 and the conventional map for region 202 can be compared to each other to identify a match. For example, since 'highway 101' 104, 'Lake X' 114, and 'C Street' 118 are common features as a result of each of these features appearing in trail map image 400 and the conventional map for region 202, the shape of each of these features will be compared. In this example, however, the scale of trail map image 400 and the conventional map for region 202 are not the same (i.e., not one-to-one) and this could potentially pose a shape matching problem. However, using confidence levels and other shape matching techniques known in the art, alignment anchors (e.g., corners, inflection points, actual feature, etc.) between trail map image 400 and the conventional map for 202 are identified. For example, alignments anchors (600a, 602a, 604a, 606a, 608a, 610a, 612a, and 614a) of the conventional map for region 202 each correspond to an identifying feature or point of (600b, 602b, 604b, 606b, 608b, 610b, 612b, and 614b) of trail map image 400. It should be understood that the alignment anchors can be points themselves or whole features.

Figure 7:
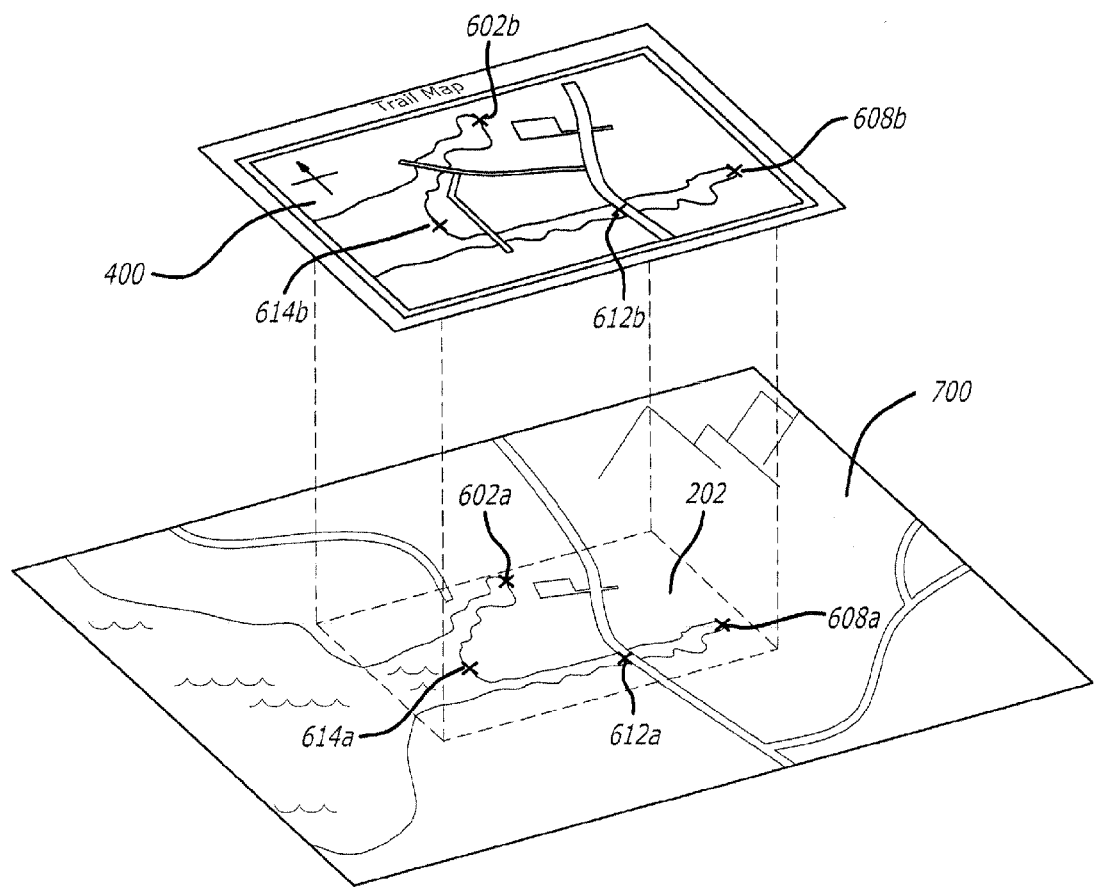
FIG. 7 illustrates an example alignment between a region of the world map from a native map application and an image of a trail map in accordance with at least one embodiment.

FIG. 7 illustrates an example alignment between trail map image 400 and region 202 relative to world map 700 of a native map application in accordance with at least one embodiment. In this example, since the latitude/longitude coordinates of alignment points (602a, 608a, 612a, and 614a) of region 202 of world map 700 are known, their corresponding alignment point (602b, 608b, 612b, and 614b) of trail map image 400 can be determined. Using this information, the latitude/longitude coordinates of uncommon features that are not represented in both trail map image 400 and the conventional map for region 202 of world map 700 (e.g., 'Picnic Area,' 'Camping Area,' etc.) can be determined. Further, these alignment anchors can be used to adjust a scaling factor of features of trail map image 400 for display concurrently with features of conventional map 202 or for displaying the correct current location of the computing device when the map is a scaled version of trail map image 400.

In order to adjust the scaling factor of these features, an image registration algorithm can be used to spatially register features from trail map image 400 region 202 of world map 700. Image registration is the process of transforming different sets of data into a single coordinate system. In one example, when a number of anchors exceed the required minimum to define an appropriate transformation, an iterative algorithm can be used to estimate the transformation, as discussed above. There are multiple ways to determine the anchors. For example, an intensity-based method can compare intensity patterns in trail map image 400 relative to region 202 using correlation metrics and can use changes in intensity or areas of uniform intensity as the anchors. A feature-based method will correspondence between trail map image 400 relative to region 202 using features such as points, lines, contours, and the like.

Once the alignment anchors have been identified, the transformation can be determined. Image registration algorithms can also be classified according to the transformation models they use to relate two images. The first category includes linear transformations, such as enlarging (increasing) or shrinking (diminishing) objects by a scale factor that is the same in all directions. These transformations typically include rotations, scaling adjustments, translations, and other affine transforms, which are global and, therefore, cannot model local geometric differences. The second category enables 'elastic' or 'non-rigid' transformations which are capable of locally warping an image to align with a reference image.

Referring back to FIGS. 6A and 6B, the scale factor associated with the distance between anchor 612a and 610a of region 202 appears to be quite different relative to 612b and 610b of trail map image 400. In this example, registering trail map image 400 to region 202 would include elongating or stretching this region of trail map image 400 to fit that of region 202. In this example, since trail map 100 is not to scale, it will likely require a transformation other than a linear transform since the distances between features are not consistent (e.g., some features require stretching, others shrinking, etc.). Accordingly, a single transformation may not be able to be made to properly account for all difference. There can, however, be an acceptable margin of error that could enable a global linear transform rather than individual local transforms for each feature if the error across all features isn't greater than a threshold level, for example.

Figure 8:
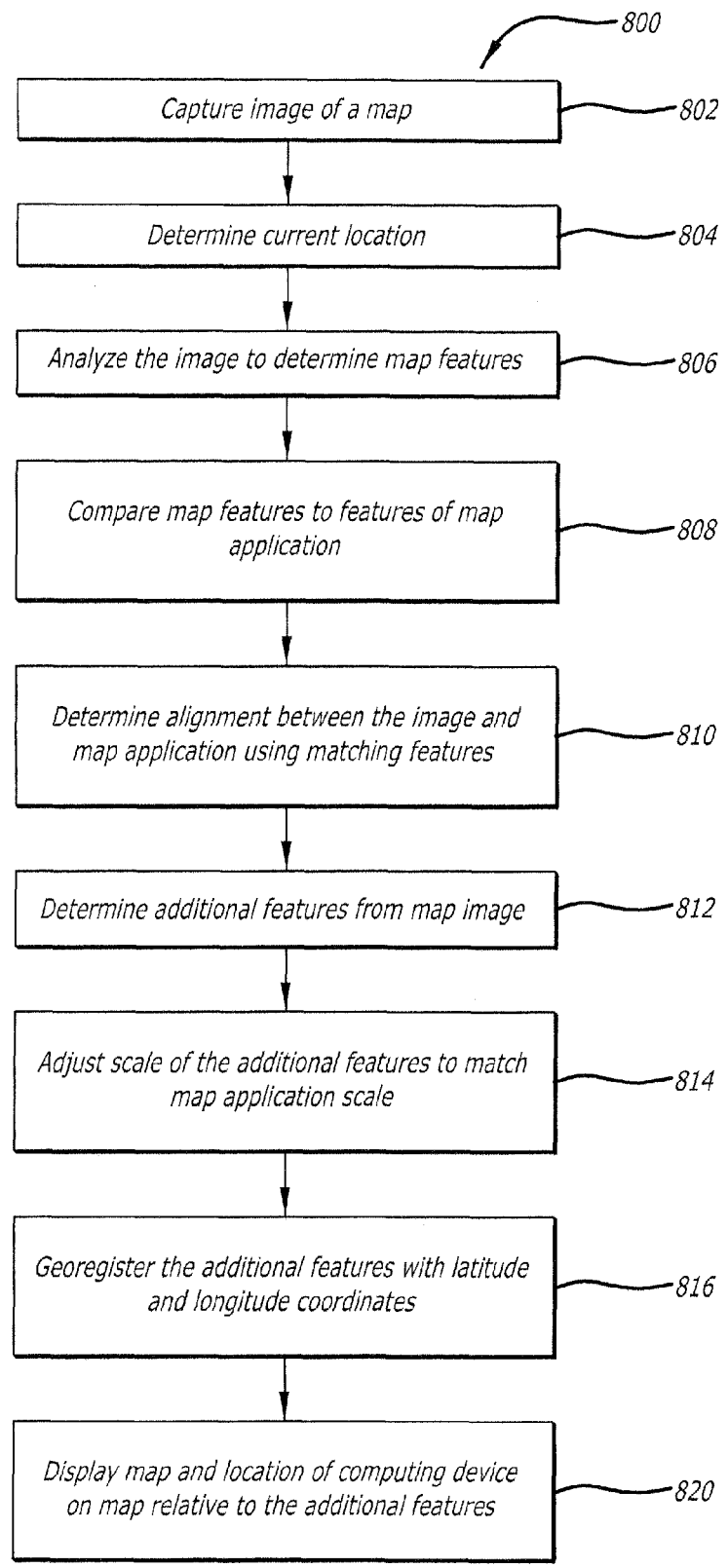
FIG. 8 illustrates an example process for geocoding features of a trail map that can be used in accordance with at least one embodiment.

FIG. 8 illustrates an example process 800 for geocoding features of a trail map that can be used in accordance with at least one embodiment. It should be understood that, for this and other processes discussed herein, there can be additional, fewer, or alternative steps, performed in similar or alternative steps, or in parallel, within the scope of the various embodiments unless otherwise stated. In this example, an image of a map (e.g., a map for a local, national, or amusement park, mall, golf course, etc.) is capture using a computing device 802. In this example, a current location of the computing device is determined at the time the image is captured 804. In this example, the current location is used to identify a region associated with a portion of the world map from which the computing device is currently located. This enables the computing device to initially filter or narrow down the amount of map data for feature comparison. Accordingly, the image is analyzed to determine features of the map captured in the image 806. These map features are then compared to features of a world map provided by a map application to determine uncommon features that are not represented in the world map provided by the mapping application 808. For example, a park map may show walking trails, vista points, restrooms, playgrounds, or other locations of interest and amenities, which may not be represented by the mapping application that is primarily concerned with street maps and the location of businesses.

Accordingly, the alignment between the image and the version of the map provided by the mapping application using matching features that are common to both the image and the version of the map provided by the mapping application 810. In one example, there could be an alignment feature hierarchy where certain features are prioritized over others. For example, features such as lakes, rivers, coastlines can be prioritized over features that may be more prone to changes, such as the name of service streets, businesses, schools, and the like. In this example, additional features from map image that are not represented in the version of the map provided by the mapping application are determined 812. The scale factor of these additional features is adjusted to match the scale factor of the version of the map provided by the mapping application 814. In this example, the scale can include not just the relative size of the features themselves, but also the scale of the distances between features. Once the scale of these features is adjusted, the additional features, in this example, are geocoded (i.e., associated with a particular location, assigned latitude/longitude coordinates, etc.) 816. Accordingly, once the location of these additional features is known relative to other features, a map for the region including the location of the computing device relative to the additional features within the map can be displayed 818. As discussed above, the additional features can be displayed as an overlay of the version of the map provided by the mapping application or the image of the map can be displayed along with an indication or pin illustrating the location of the computing device on the image of the map data.

Figure 9A:
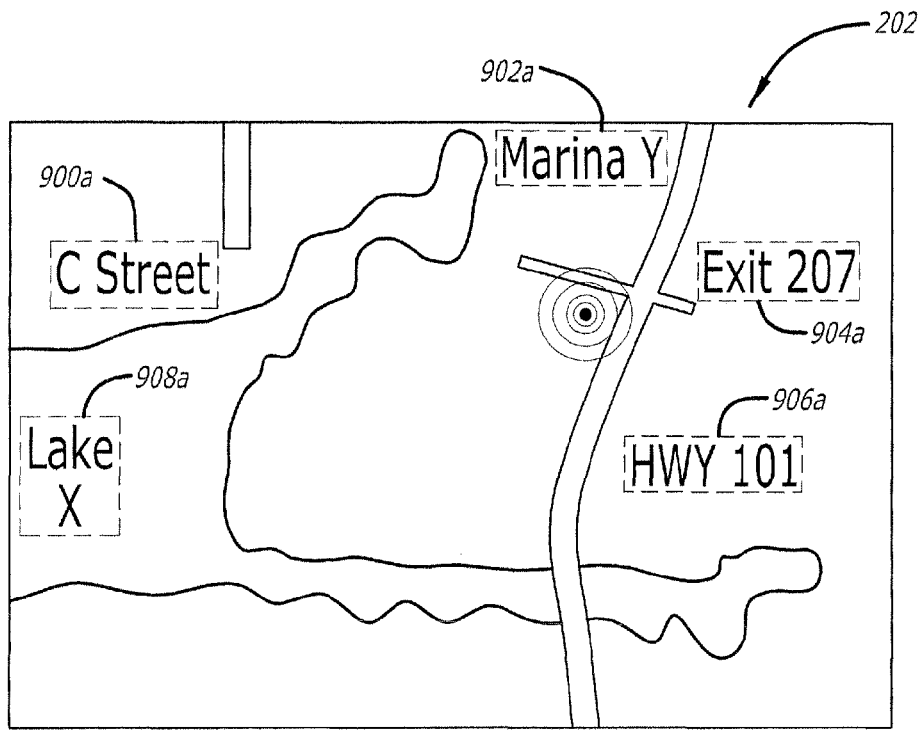
FIGS. 9A to 9B illustrate example recognized text regions that can be used to identify or verify a map region and/or align feature of an image of a trail map with a map from a native map application in accordance with at least one embodiment.
Figure 9B:
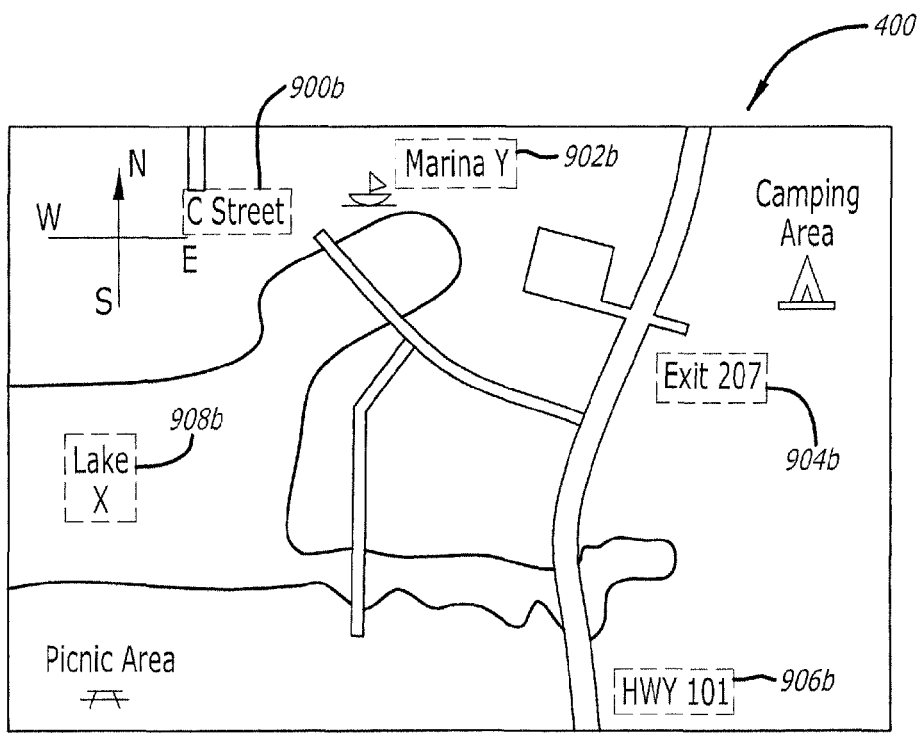

FIGS. 9A to 9B illustrates example recognized text regions that can be used to identify or verify a map region and/or align feature of an image of a trail map with a map from a native map application in accordance with at least one embodiment. In this example, since each of the features discussed above with respect to FIG. 1 (e.g., 'highway 101' 104, walking 'Trail A' 106, walking 'Trail B' 108, 'Picnic Area' 112, 'Lake X' 114, 'C Street' 118, 'Marina Y' 122, 'Restrooms' 124, 'Camping Area' 126, etc.) contains text, trail map image 400 can be analyzed using a text recognition algorithm or Optical Character Recognition (OCR) engine to identify labeled features, such as roads, rivers, lakes, parks, and the like, which are commonly labeled on most maps. The recognized text of these labels (900a, 902a, 904a, 906a, and 908a) can then be compared to text of the labels (900b, 902b, 904b, 906b, and 908b) from conventional map 202. As discussed above, given the abundance of map data, it can be necessary to filter or narrow the set of map data (e.g., for minimizing latency, the consumption of processing resources, etc.) to compare against these map image features. Accordingly, once the current location of the computing device has been determined, the recognized text from trail map image 400 can be used to further filter the set of map data to compare against these map image features. Additionally, the recognized text from trail map image 400 can be used verify that the current location of the computing device 200 is correct by identifying matching labels.

As discussed above, since it is common for trail maps to be represented in a scale that is not one-to-one with real-world features the recognized text of the labels can be used to identify features. For example, the shape of 'Lake X,' shown in FIG. 9A, of conventional map 202 is not exactly the same as the shape of 'Lake X,' shown in FIG. 9B, of trail map image 400. If the shape of 'Lake X' in each of these maps is sufficiently different, a shape matching algorithm may not identify 'Lake X' as a matching feature in common between these two maps. Accordingly, the recognized text of labels 908a and 908b can be used to make up for the difference in shape. For example, a shape matching algorithm could have returned a value that indicated that the algorithm is only 55% confident that 'Lake X' is a matching feature between conventional map 202 and trail map image 400. If the threshold confidence values requires a value that is greater than 70% confidence, then 'Lake X' will not be considered a match. If, however, each of these shapes is associated with a label that contains matching text (i.e., 'Lake X'), then the confidence value could be adjusted over 70% and, therefore, considered a match.

Additionally, since map iconography is relatively uniform, this technique can also be used for map icons, such as tent icon for 'Camping Area' 126, table icon 110 for 'Picnic Area' 112, and boat icon 120 for 'Marina Y' 122. For example, the icon for restrooms is almost universal and recognizing the restroom icon in a location on one map can be used to identify the restrooms on another map using the teachings discussed herein. In one example, the compass 116, Further, since bodies of water (e.g., lakes, rivers, oceans, etc.) are often represented by the color blue, roads are often represented in black, parks or forest are often represented by the color green, and the like, the color of features from trail map image 400 can be analyzed using a pattern recognition algorithm to match features in the database for the native map application. Accordingly, an equation for determining matching features between maps can use a confidence value or a shape matching weight, a label matching weight, an icon matching weight, and a color matching weight or any subset of the same as inputs.

Figure 10:
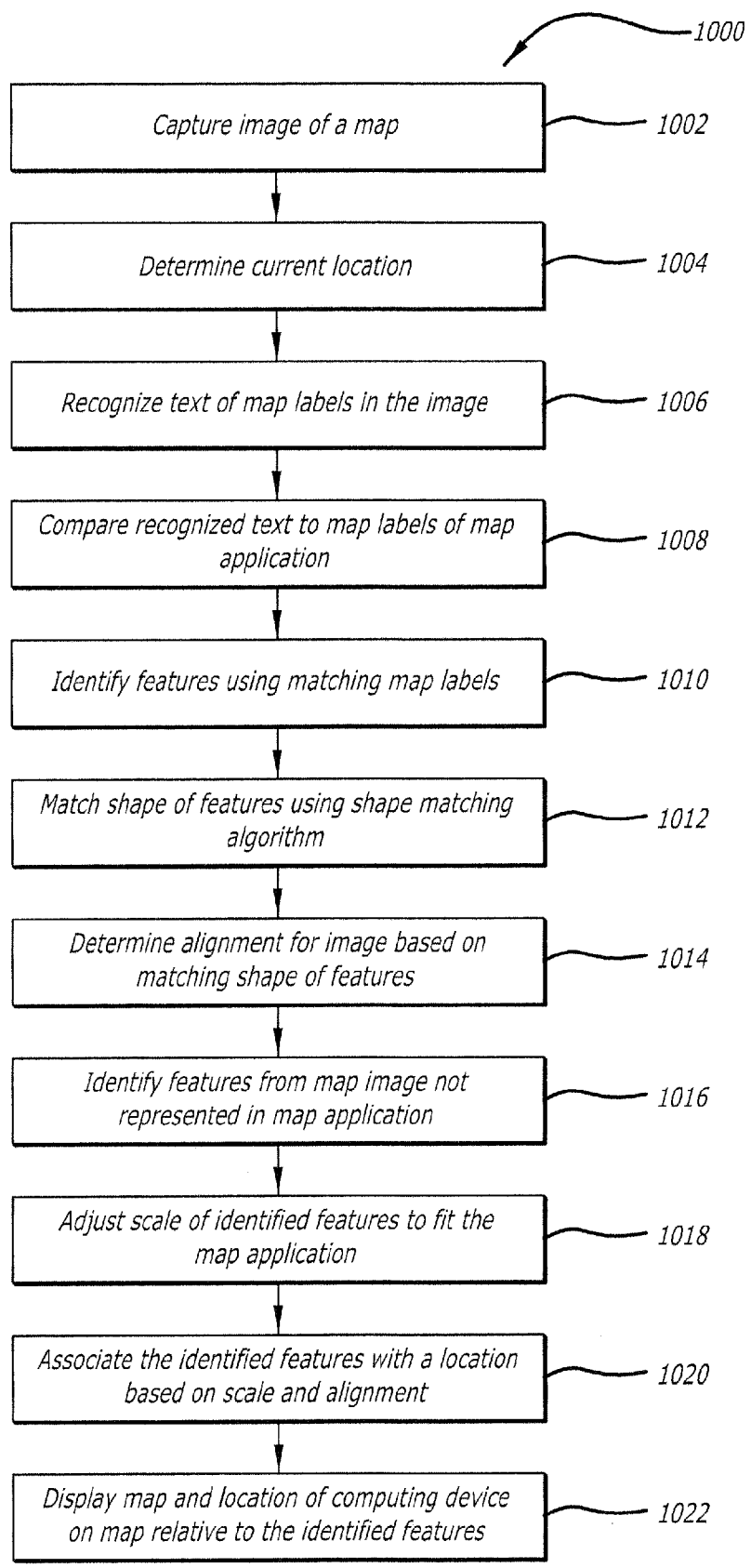
FIG. 10 illustrates an example process for geocoding features of a trail map that can be used in accordance with at least one embodiment.

FIG. 10 illustrates an example process 1000 for geocoding features of a trail map that can be used in accordance with at least one embodiment. In this example, an image of a map (e.g., a map for a local, national, or amusement park, mall, golf course, etc.) is capture using a computing device 1002. In this example, a current location of the computing device is determined at the time the image is captured 1004. Accordingly, the image is analyzed to recognize text of map labels captured in the image 1006. These recognized map labels are then compared to map labels of a world map provided by a map application 1008. In this example, the map labels are used to identify matching map labels 1010. Accordingly, the shapes of corresponding map features associated with matching map labels are matched 1012. In this example, an alignment is determined using the location of matching features that are common to both the image and the version of the map provided by the mapping application 1014. In this example, features from map image that are not represented in the version of the map are identified 1016. The scale of these additional features is adjusted to match the scale of the version of the map provided by the mapping application 1018. Once the scale of these features is adjusted, the identified features are associated with a location based on the adjusted scale and alignment 1020. Accordingly, once the location of the identified features is known relative to other features, a map for the region including the location of the computing device relative to the identified features within the map can be displayed 1022. As discussed above, the identified features can be displayed as an overlay of the version of the map provided by the mapping application or the image of the map can be displayed along with an indication or pin illustrating the location of the computing device on the image of the map data.

In at least one embodiment, geocoding features of a trail map can include various social networking features. For example, if a user's friends from any number of social networks have geocode features of a park map, the user can be notified upon enter a park corresponding to the park map. In another embodiment, the geocoded features of park maps could be used to supplement data of the native map application. This data could then be provided as an option or additional layer or overlay of the native map application. In this example, the geocoded features could supplement the native map application on the user's computing device by storing these features locally. In another example, the geocoded features could be crowd sourced from many users. In at least one embodiment, the scale of the map or location of features could be refined based on the user's movement within the park. For example, if a trail in the park is displayed on the map in a location that is slightly off from its true location, such that the current location indicator shows the user travelling a similar path that is not displayed on the trail, the scale of the map or location of the trail can be adjusted so that the current location indicator appears on the trail. Further, many amusement park maps are represented from a perspective view, which can also vary the relative distances between features of the map image and their corresponding features in the map data. Accordingly, alignment points between corresponding matching features between an image of a map represented in the perspective view and a map represented in a planar view can be used to adjust the scale new features represented in the perspective view to the scale of map in the planar view.

Figures 11A, 11B:
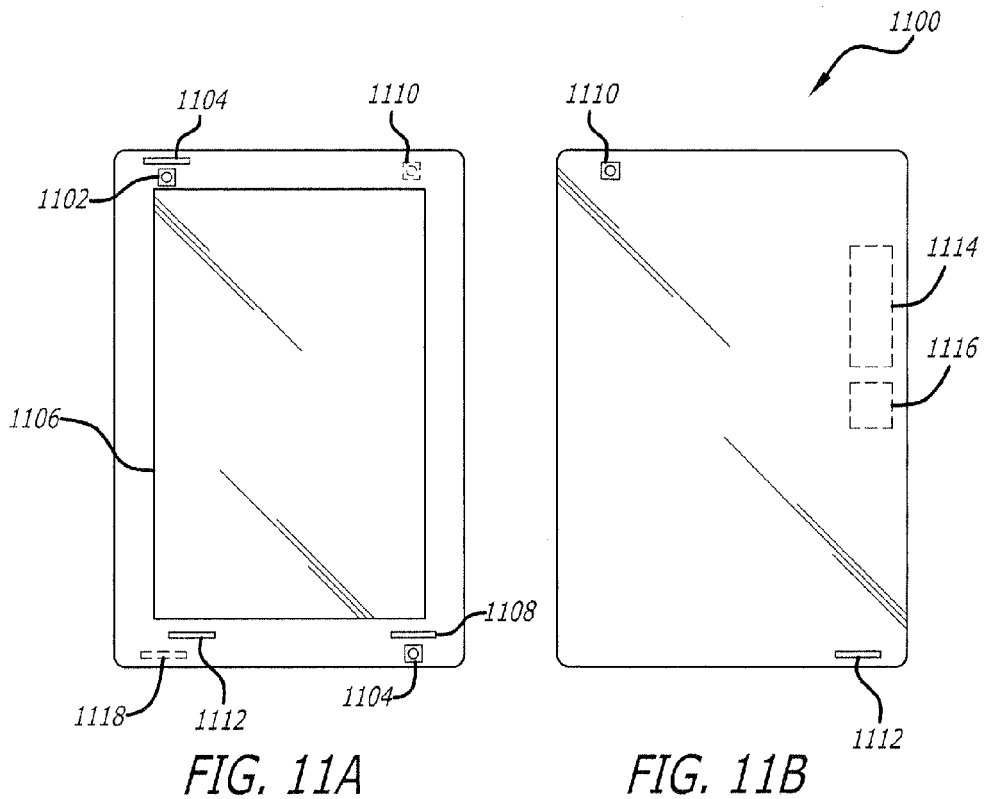
FIGS. 11A and 11B illustrate an example computing device that can be used to implement aspects of various embodiments.

FIGS. 11A and 11B illustrate front and back views, respectively, of an example electronic computing device 1100 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 1100 has a display screen 1102 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 1104 on the front of the device and at least one image capture element 1110 on the back of the device. It should be understood, however, that image capture elements could also, or alternatively, be placed on the sides or corners of the device, and that there can be any appropriate number of capture elements of similar or different types. Each image capture element 1104 and 1110 may be, for example, a camera, a charge-coupled element (CCD), a motion detection sensor or an infrared sensor, or other image capturing technology.

As discussed, the device can use the images (e.g., still or video) captured from the imaging elements 1104 and 1110 to generate a three-dimensional simulation of the surrounding environment (e.g., a virtual reality of the surrounding environment for display on the display element of the device). Further, the device can utilize outputs from at least one of the image capture elements 1104 and 1110 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 1108 on the front side, one microphone 1112 on the back, and one microphone 1106 on or near a top or side of the device. In some devices there may be only one microphone, while in other devices there might be at least one microphone on each side and/or corner of the device, or in other appropriate locations.

The device 1100 in this example also includes one or more orientation- or position-determining elements 1118 operable to provide information such as a position, direction, motion, or orientation of the device. These elements can include, for example, accelerometers, inertial sensors, electronic gyroscopes, and electronic compasses.

The example device also includes at least one communication mechanism 1114, such as may include at least one wired or wireless component operable to communicate with one or more electronic or computing devices. The device also includes a power system 1116, such as may include a battery operable to be recharged through conventional plug-in approaches, or through other approaches such as capacitive charging through proximity with a power mat or other such element. Various other elements and/or combinations are possible as well within the scope of various embodiments.

Figure 12:
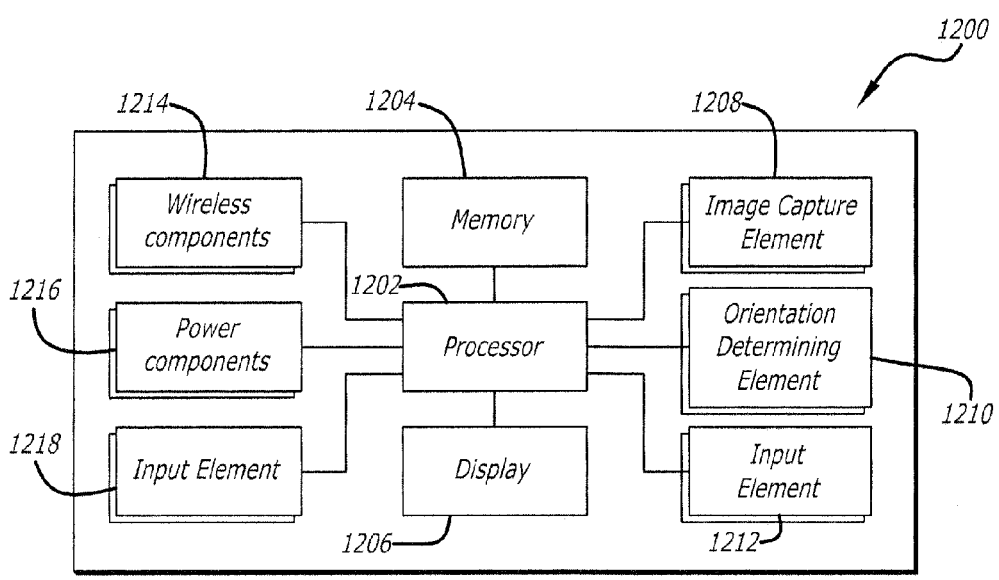
FIG. 12 illustrates example components that can be used with a device such as that illustrated in FIGS. 11A and 11B.

FIG. 12 illustrates a set of basic components of an electronic computing device 1200 such as the device 1100 described with respect to FIG. 11. In this example, the device includes at least one processing unit 1202 for executing instructions that can be stored in a memory element or element 1204. As would be apparent to one of ordinary skill in the art, the device can include many types of memory, data storage, or computer-readable media, such as a first data storage for program instructions for execution by the processing unit(s) 1202, the same or separate storage can be used for images or data, a removable memory can be available for sharing information with other devices, and any number of communication approaches can be available for sharing with other devices.

The device typically will include some type of display element 1206, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1208, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1200 also includes at least one orientation determining element 1210 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1200. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1212 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1214 operable to communicate with one or more electronic or computing devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1216, such as may include a battery operable to be recharged through conventional plug-in approaches, or through other approaches such as capacitive charging through proximity with a power mat or other such component. Various other elements and/or combinations are possible as well within the scope of various embodiments.

In some embodiments the device can include at least one additional input element 1218 able to receive conventional input from a user. This conventional input can include, for example, a push button, touch pad, touch screen, wheel, joystick, keyboard, mouse, keypad, or any other such component or element whereby a user can input a command to the device. These I/O elements could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 13:
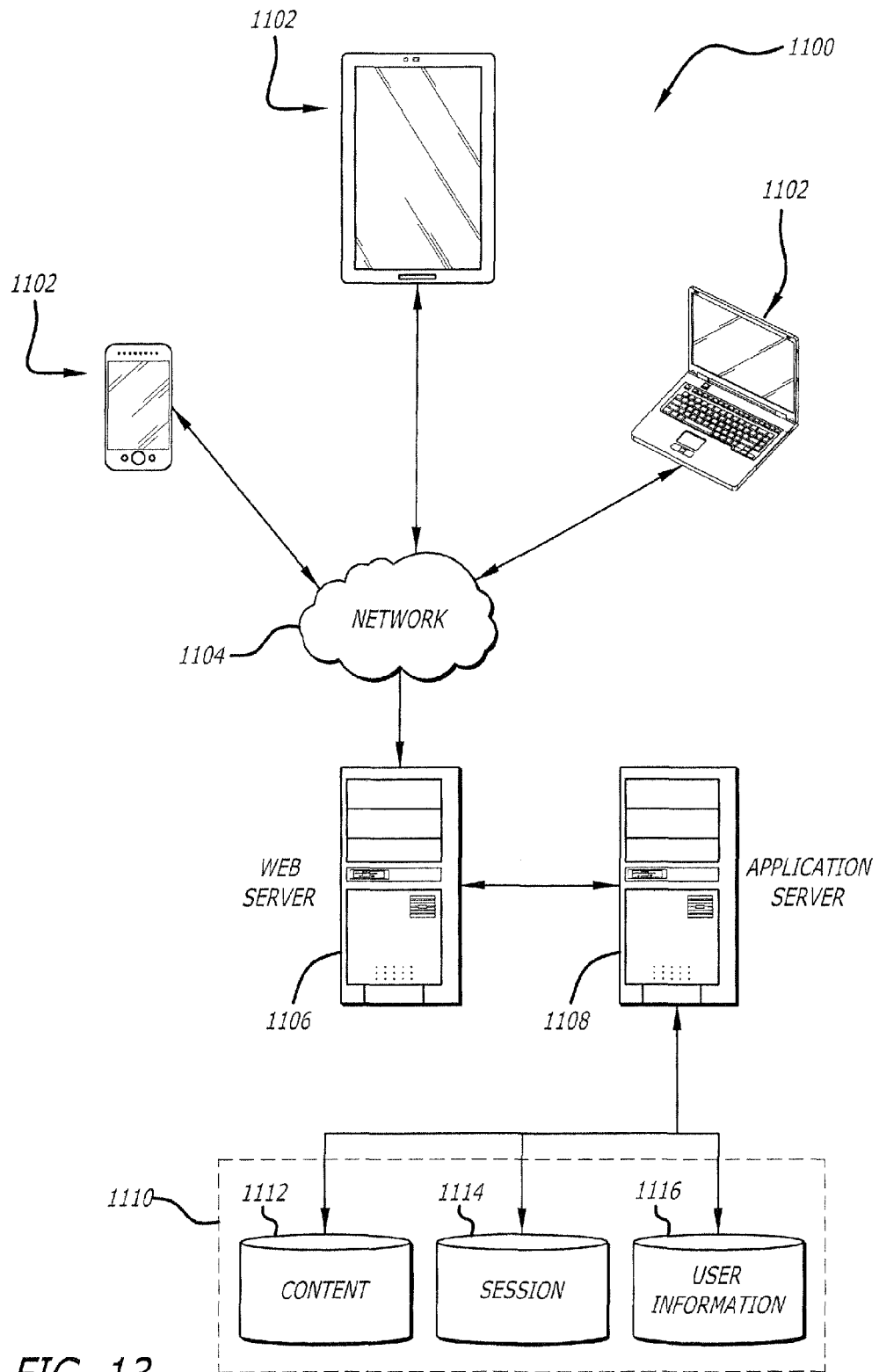
FIG. 13 illustrates an environment in which various embodiments can be implemented.

As discussed, different approaches can be implemented in various environments in accordance with the described embodiments. For example, FIG. 13 illustrates an example of an environment 1300 for implementing aspects in accordance with various embodiments. As will be appreciated, although a Web-based environment is used for purposes of explanation, different environments may be used, as appropriate, to implement various embodiments. The system includes an electronic client device 1302, which can include any appropriate device operable to send and receive requests, messages or information over an appropriate network 1304 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1306 for receiving requests and serving content in response thereto, although for other networks, an alternative device serving a similar purpose could be used, as would be apparent to one of ordinary skill in the art.

The illustrative environment includes at least one application server 1308 and a data store 1310. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1308 can include any appropriate hardware and software for integrating with the data store 1310 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1306 in the form of HTML, XML or another appropriate structured language in this example. The handling of all requests and responses, as well as the delivery of content between the client device 1302 and the application server 1308, can be handled by the Web server 1306. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing content (e.g., production data) 1312 and user information 1316, which can be used to serve content for the production side. The data store is also shown to include a mechanism for storing log or session data 1314. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A non-transitory computer-readable storage medium storing instructions that, when executed by at least one processor, cause a computing device to:

capture, using a camera of the computing device, an image of a park map, the park map having at least one of a difference in scale or a difference in perspective relative to a portion of a world map available via a map application stored in memory of the computing device;

determine a region associated with the portion of the world map using a current location of the computing device;

analyze the image to determine a set of park features of the park map;

compare the set of park features to features of the portion of the world map for the region available via the map application;

match a first park feature with a first world map feature, wherein the first park feature is included in the set of park features and the first world map feature is included in the features of the portion of the world map;

match a second park feature with a second world map feature, wherein the second park feature is included in the set of park features and the second world map feature is included in the features of the portion of the world map;

generate a first anchor for the image based on the first park feature matching the first world map feature;

generate a second anchor for the image based on the second park feature matching the second world map feature;

determine an uncommon park map feature from the set of park features, the uncommon park map feature being omitted from the map application;

geocode the first anchor to have a first set of latitude and longitude coordinates;

geocode the second anchor to have a second set of latitude and longitude coordinates;

assign a third set of latitude and longitude coordinates to the uncommon park map feature, the third set of latitude and longitude coordinates being determined based at least partly on a scaling factor that compensates for spatial inconsistencies between the first world map feature and the second world map feature relative to the first park feature and the second park feature; and display an indication of the current location of the computing device on the image of the park map based on the first set of latitude and longitude coordinates, the second set of latitude and longitude coordinates, and the third set of latitude and longitude coordinates.

2. The non-transitory computer-readable storage medium of claim 1, wherein at least a subset of the park map features and the features of the world map associated with the map application are at least one of physical features or map labels, and wherein comparing the set of park map features to the features of the world map includes at least one of:

comparing, using a feature recognition algorithm, shapes of physical features of the park map to the shapes of physical features of the world map associated with the map application for the current location to determine the first anchor and the second anchor; or recognizing, using an optical character recognition engine, text of park map labels from the image and map labels from the world map for the current location; and comparing the recognized text of the park map labels from the image and the map labels from the world map for the current location to determine the first anchor and the second anchor.

3. The non-transitory computer-readable storage medium of claim 1, wherein analyzing the image to determine the set of park features includes identifying the set of park features of the park map using at least one of a Scale-Invariant Feature Transform (SIFT) algorithm or a Speeded Up Robust Features (SURF) algorithm.

4. The non-transitory computer-readable storage medium of claim 1, wherein adjusting the scaling factor of the uncommon park map feature includes locally warping the at least one of the uncommon park map feature using an elastic transformation algorithm, wherein locally warping includes at least one of stretching, elongating, enlarging, or shrinking the uncommon park map feature to align with the features of the world map based at least in part on the first anchor and the second anchor.

5. A computer-implemented method, comprising:

capturing an image of a first map using an image capture element of a computing device;

analyzing the image to determine a first feature of the first map, the first feature representing a first object at a first geographic location;

analyzing the image to determine a second feature of the first map, the second feature representing a second object at a second geographic location;

associating the first feature to a third feature of a stored second map, the third feature representing the first object;

associating the second feature to a fourth feature of the stored second map, the fourth feature representing the second object;

determining an uncommon feature that is present in the first map and absent from the stored second map;

associating, using a scaling factor, the uncommon feature with a geographic location; and displaying, on a display screen of the computing device, an indication of a current location of the computing device in a third map, the third map including the uncommon feature displayed concurrently with features common to both the first map and the stored second map.

6. The computer-implemented method of claim 5, further comprising:

adjusting, using the at least one scaling factor, at least one of a scale or relative location of the uncommon feature of the first map to match the scale of the second map; and generating, by a native map application of the computing device, the third map for display, the third map including the second map and the uncommon feature as an overlay to the second map.

7. The computer-implemented method of claim 5, further comprising:

adjusting, using the at least one scaling factor, a scale of the first map to match the scale of the second map; and generating the third map for display, the third map comprising the image of the first map adjusted to match the scale of the second map.

8. The computer-implemented method of claim 5, further comprising:
adjusting, using the at least one scaling factor, a scale of the first map to match the scale of the second map; and
generating the third map for display, the third map comprising the second map adjusted to match the scale of the image of the first map.

9. The computer-implemented method of claim 5, further comprising:
comparing the set of first features to a set of second features of the second map, wherein comparing the set of first features to the set of second features includes comparing an associated definition of a color of a respective first feature to a corresponding second feature.

10. The computer-implemented method of claim 5, wherein the set of features of the first map are physical features, and wherein determining at least one uncommon feature that is absent from the second map includes:
comparing, using a shape recognition algorithm, shapes of physical features of the first map to the shapes of physical features of the second map for the current location to determine a set of anchors for displaying the at least one uncommon feature concurrently with the features common to both the first map and the second map.

11. The computer-implemented method of claim 10, wherein the physical features common to both the first map and the second map include at least one of roads, landmarks, or geographic features, and wherein the at least one uncommon feature is at least one of a trail, a recreational area, or a point of interests.

12. The computer-implemented method of claim 5, wherein set of features of the first map are map labels, and wherein determining at least one uncommon feature that is absent from the second map includes:
recognizing, using an optical character recognition engine, text of the map labels from the first map and text of map labels from the second map for the current location; and
comparing the recognized text of the map labels from the first map to the recognized text of the map labels from the second map to determine a set of anchors for displaying the at least one uncommon feature concurrently with the features common to both the first map and the second map.

13. The computer-implemented method of claim 5, further comprising:
supplementing a native map application on the computing device with map data for the at least one uncommon feature.

14. The computer-implemented method of claim 5, wherein analyzing the image to determine the set of features of the first map includes identifying the set of features using at least one of a Scale-Invariant Feature Transform (SIFT) algorithm or a Speeded Up Robust Features (SURF) algorithm.

15. A computing device, comprising:
a processor;
a display screen; and
memory including instructions that, when executed by the processor, cause the computing device to:
capture, using a camera of the computing device, an image of a park map;
analyze the image to determine a set of park features of the park map;
compare the set of park features to features of a world map stored in memory;
match a first park feature with a first world map feature, wherein the first park feature is included in the set of park features and the first world map feature is included in the features of the world map;
match a second park feature with a second world map feature, wherein the second park feature is included in the set of park features and the second world map feature is included in the features of the world map;
generate a first anchor for the image based on the first park feature matching the first world map feature;
generate a second anchor for the image based on the second park feature matching the second world map feature;
determine an uncommon park map feature, wherein the uncommon park map feature is absent from the world map;
geocode the first anchor to have a first set of latitude and longitude coordinates;
geocode the second anchor to have a second set of latitude and longitude coordinates;
assign a third set of latitude and longitude coordinates to the uncommon park map feature based at least partly on a scaling factor between the first world map feature and the second world map feature relative to the first park feature and the second park feature; and
display an indication of a current location of the computing device on at least one of the world map relative to the uncommon feature or the image of the park map based on the first set of latitude and longitude coordinates, the second set of latitude and longitude coordinates, and the third set of latitude and longitude coordinates.

16. The computing device of claim 15, wherein at least a subset of the set features of the first map and the features of the second map are map labels, and wherein comparing the set of features of the first map to the features of the second map includes:
recognizing, using an optical character recognition engine, text of map labels from the image and map labels from the map for the current location; and
comparing the recognized text of the map labels from the image and the map labels from the map for the current location to determine the first anchor and the second anchor.

17. The computing device of claim 15, wherein comparing the set of features to the features of the second map includes comparing color of a respective first feature to a corresponding second feature.

18. The computing device of claim 15, wherein the instructions that, when executed by the processor, further cause the computing device to:
supplement a native map application on the computing device with map data for the at least one uncommon feature.

19. The computing device of claim 15, wherein at least a subset of the features of the first map and the features of the second map are physical features, and wherein comparing the set of features of the first map to the features of the second map includes:
comparing, using a shape recognition algorithm, shapes of physical features of the first map to the shapes of physical features of the second map to determine the first anchor and the second anchor.

20. The computing device of claim 19, wherein the physical features of the first map and the second map include at least one of roads, landmarks, or geographic features, and wherein the uncommon park map feature is at least one of a trail, a recreational area, or a point of interests.

\* \* \* \* \*